Dec. 10, 1929.    R. A. PHILIP    1,738,726
REGULATING DEVICE FOR ELECTRICAL SYSTEMS
Filed Aug. 16, 1924    3 Sheets-Sheet 1

INVENTOR
Robert A. Philip
BY
Harfield & Watson
ATTORNEY

Dec. 10, 1929.   R. A. PHILIP   1,738,726
REGULATING DEVICE FOR ELECTRICAL SYSTEMS
Filed Aug. 16, 1924   3 Sheets-Sheet 2

INVENTOR
Robert A. Philip
BY
Harfield & Watson
ATTORNEY

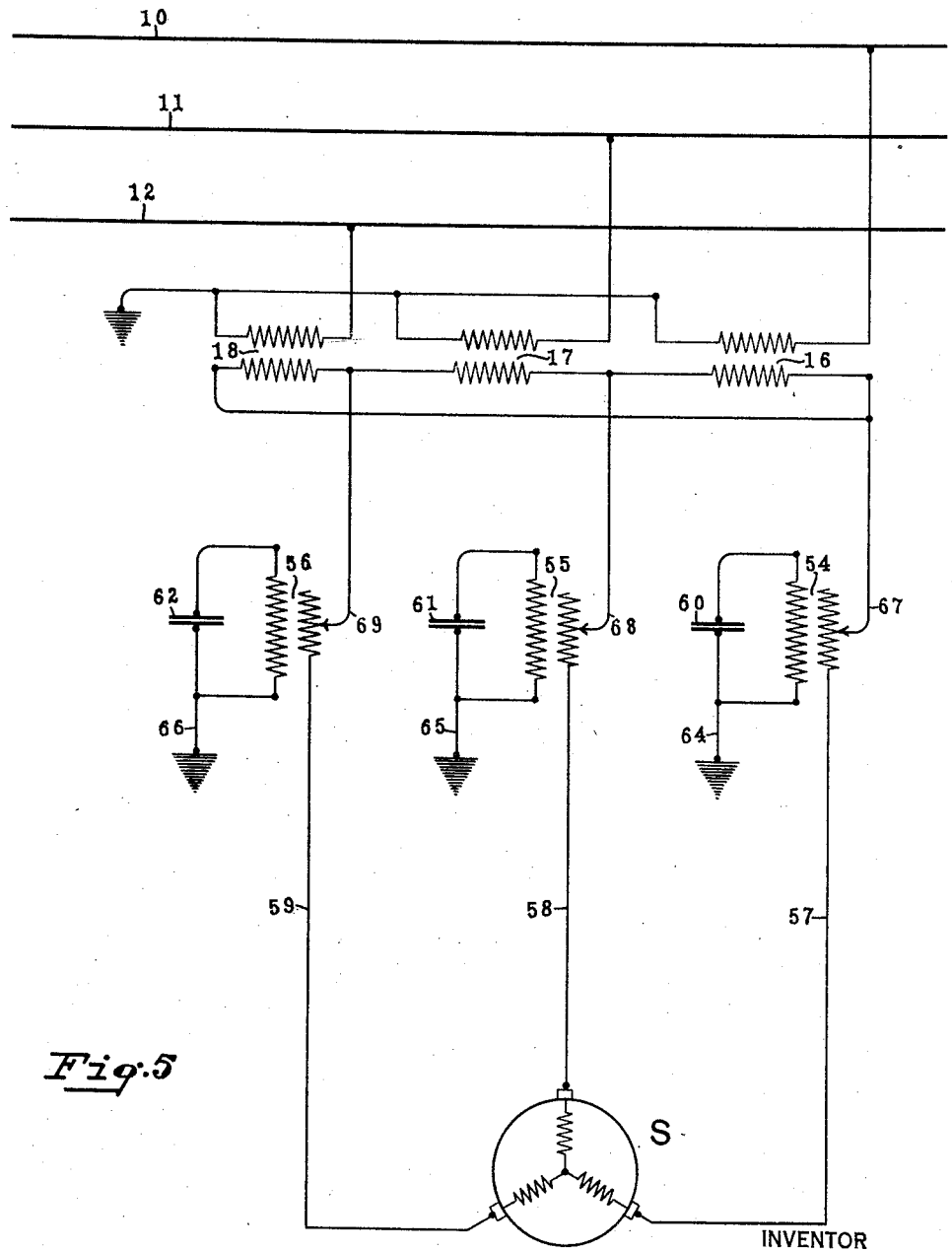

Patented Dec. 10, 1929

1,738,726

UNITED STATES PATENT OFFICE

ROBERT A. PHILIP, OF NEW YORK, N. Y., ASSIGNOR TO DWIGHT P. ROBINSON & COMPANY, INC., OF NEW YORK, N. Y., A CORPORATION OF VIRGINIA

REGULATING DEVICE FOR ELECTRICAL SYSTEMS

Application filed August 16, 1924. Serial No. 732,415.

This invention relates to electrical systems for distributing alternating currents, and more particularly to a regulating device therefor adapted to regulate the voltage or power factor of the transmission line.

This invention has for its object, generally, to provide a system for distributing alternating currents which is efficient, economical and readily adapted to maintain the voltage of a long line within very narrow limits.

More specifically, an object of this invention is to provide a corrective device involving the use of a synchronous dynamo-electric machine for regulating the voltage which is so arranged as to be free from inherent limitations of the degree of regulation which a given machine was heretofore capable of effecting.

Another object of this invention is to provide a regulating device combining the advantageous features of both synchronous condensers and electrostatic condensers whereby voltage or power factor regulation may be effected with reduced size of synchronous condenser and less copper and iron losses.

Other objects of the invention will in part be obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Figs. 3, 4 and 5 are diagrammatic views similar to Fig. 1 but showing modifications thereof which embody this invention.

Figure 1:
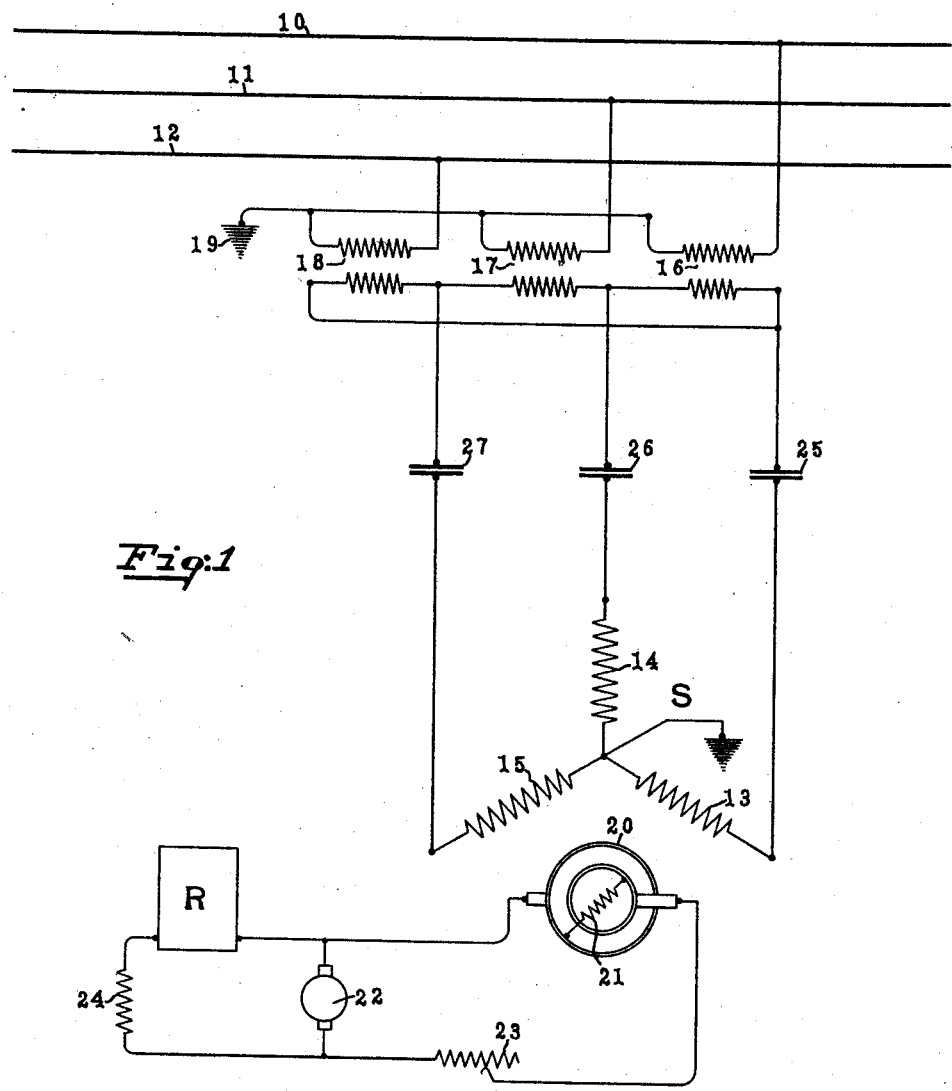
Figure 1 is a diagrammatic view of a portion of an electrical system for distributing alternating currents which is provided with a regulating device constructed in accordance with this invention.

Referring now to the drawing, 10, 11 and 12 denote respectively main conductors of a three-phase transmission line adapted for transmitting high tension alternating currents. Connected in multiple with the transmission line is a synchronous dynamo-electric machine S adapted for operation as a condenser to effect voltage or power factor regulation.

In Fig. 1 the synchronous condenser S is indicated as having star-connected stator windings 13, 14 and 15. These windings are connected to the transmission line in any suitable manner, for example, inductively by means of the transformers 16, 17 and 18 which have their primaries star-connected with the neutral grounded as shown at 19, while the secondaries are connected delta. It will be obvious, however, that the synchronous condenser might equally well be connected conductively with the transmission line, where the line voltages permit.

The synchronous condenser here shown has a rotor 20 provided with a field winding 21 across which is connected an exciter 22 for supplying the exciting field current. A regulating resistance for the exciting current is shown at 23 connected in series with the winding 21. A field winding for the exciter is indicated at 24. This field winding is a shunt winding and has a regulator R connected in series therewith. The regulator R may be an ordinary adjustable rheostat or may include any convenient automatic regulator, for example, a vibrating reed, or a Tirrill regulator.

In the regulation of the voltage for transmission lines, synchronous condensers, connected in multiple therewith at some suitable point have been commonly used, since synchronous condensers have an inherent characteristic by which they tend to correct any deviation from a normal voltage which may occur in the transmission line while in service, thereby giving automatically at least a partial line regulation.

This automatic corrective action of a synchronous condenser, however, is only brought into play when the line voltage deviates materially from normal so that at best it can make only a moderate reduction in the voltage deviation which it is unable to prevent. For a relatively large deviation of the voltage from normal, for example, a 10% deviation, there is brought into play only a small part, for example, 10%, of the capacity of a synchronous condenser where its automatic corrective action is depended on. Accordingly, where it is desired to regulate a line so that the total variation of voltage shall not exceed a variation of more than 10% (i. e. 5% above and 5% below normal) by means of the inherent regulating characteristics of the synchronous condenser alone, then only about 10% of the rated kilovolt-ampere capacity of the synchronous condensers would be developed in useful kilovolt-ampere output. On account of the inefficiency with which the capacity of synchronous condensers is utilized when its automatic corrective action is depended upon, it is customary to supplement such automatic action with some auxiliary regulating device, such for example as the regulator shown at R in series with the field of the exciter. The use of an auxiliary regulating device of this character permits the full regulating capacity of the synchronous condenser to be brought into play as needed whenever a small voltage deviation occurs, for example, one so small as to develop only a negligible part of the capacity of the synchronous condenser operating under its own automatic action.

Synchronous condensers when provided with auxiliary regulating devices, as above described still have certain well recognized limitations upon the degree of regulation which they are capable of effecting, arising out of their effective internal or inductive reactance.

The electrostatic condenser, more frequently referred to simply as a "static condenser", does not of itself involve this latter defect, but is known to be otherwise unsuitable for use as a means for regulating voltage or correcting power factor. See for example page 221 of the March, 1924, issue of the Journal of A. I. E. E. in an article entitled "Limitations on output of a power system involving long transmission lines" by E. Shand, where it is stated, "Static condensers are inherently unsuitable for the regulation of long lines".

In the practice of this invention, a regulating device is provided by means of the combined use of a synchronous condenser with an electrostatic condenser arranged so that their inherent characteristics are mutually complementary. Since a static condenser has a condensive reactance which acts in the same sense as the beneficial condensive reactance but in an opposite sense from the detrimental effective inductive reactance of a synchronous condenser, the capacitance of a static condenser is to be compounded with the capacitance of a synchronous condenser; the two types of condensers being placed in such relation and so proportioned that the condensive reactance of the static condenser substantially neutralizes the inductive reactance of the synchronous condenser. This relation is achieved practically by means of a series connection. Accordingly three static condensers designed for this purpose are shown at 25, 26 and 27 connected respectively in series with the connections to stator windings 13, 14 and 15.

Figure 2:
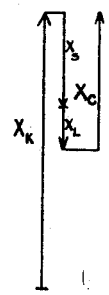
Fig. 2 is a reactance diagram illustrating certain characteristic properties of the regulating device of this invention.

The condensive reactance of the condensers, 25, 26 and 27 is to be proportioned with respect to its connections as illustrated diagrammatically in Fig. 2 where $X_c$ denotes the magnitude of the condensive reactance of the static condenser which is to be equal and opposite to the total effective inductive reactance of the connection in which it functions which comprises in this instance the inductive reactance $X_s$ of the synchronous condenser and the series inductive reactance $X_L$ of the transformer in the connection, $X_k$ denoting the total condensive reactance of the synchronous condenser.

It is well understood in the art that the inductive reactance of a synchronous dynamo-electric machine has one value known as the transient reactance which is developed instantly and another larger value known as the synchronous reactance or steady state reactance which requires a small but appreciable time to develop. Where an auxiliary and more slow moving regulating device such as the regulator R Fig. 1 is also in use, the condensive reactance $X_c$ of the electrostatic condenser may be based on the transient value of the inductive reactance $X_s$ of the synchronous condenser. The condensive reactance $X_c$ of the electrostatic condenser may however be based on that value of the inductive reactance which corresponds to the synchronous reactance of the synchronous condenser in which case the voltage will be regulated as required in the steady state and in addition an advantageous transient over compounding may be obtained.

Figure 3:
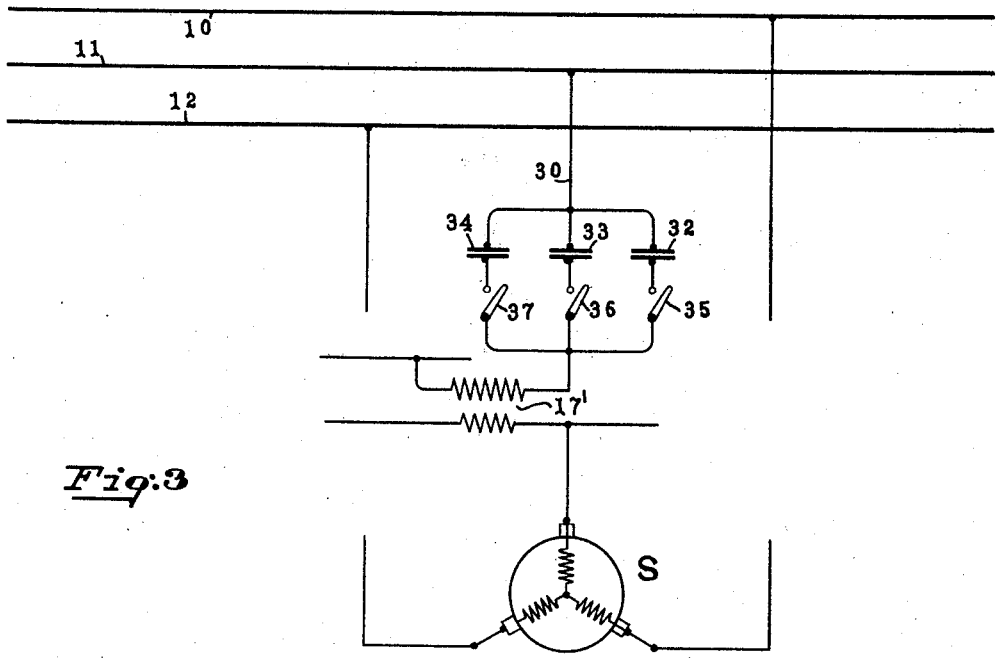

In Fig. 3 the static condensers are shown as located between the transformers and the transmission line. In the interest of clearness but one connection is shown, namely, connection 30 leading from the transmission line to the transformer 17'. By thus placing the condensers in the high tension side, the advantages of a high voltage are made available thereby permitting a different and cheaper construction for the condensers than would be used for the arrangement described above. By the use of the connection shown in Fig. 3 the condenser may be located out-of-doors and be constructed in accordance with the practice of transmission line construction using wires, cables, nets, sheets or tubes for the condenser plates and employing the air as the dielectric between the elements of the condenser, and elsewhere utilizing standard line insulators for insulating purposes.

The capacitance of the condenser is also indicated as adjustable, though this feature is optional with the use of any static condenser placed in accordance with this invention. As here shown this condenser comprises three parts, 32, 33 and 34 connected in parallel and provided respectively with switches 35, 36 and 37. When the switches are all closed, it will be observed that their capacitance is all in and the condensive reactance thereof is a minimum.

The capacitance of the three condensers 32, 33 and 34 is proportioned so that when all three switches are closed the condensive reactance is somewhat less than the inductive reactance of the synchronous condenser thereby giving under compounding. When one switch is open, for example, that at 35, the arrangement is preferably such that the condensive reactance of the two remaining static condensers is substantially equal in numerical magnitude to the inductive reactance of the synchronous condenser thereby giving flat compounding so that substantially constant voltage for all values of reactive current results. When two switches are open, for example, the switches at 35 and 36, the condensive reactance of the static condensers should sufficiently exceed the inductive reactance of the synchronous condenser so as to give over compounding and a rising voltage characteristic as the reactive current increases.

Figure 4:
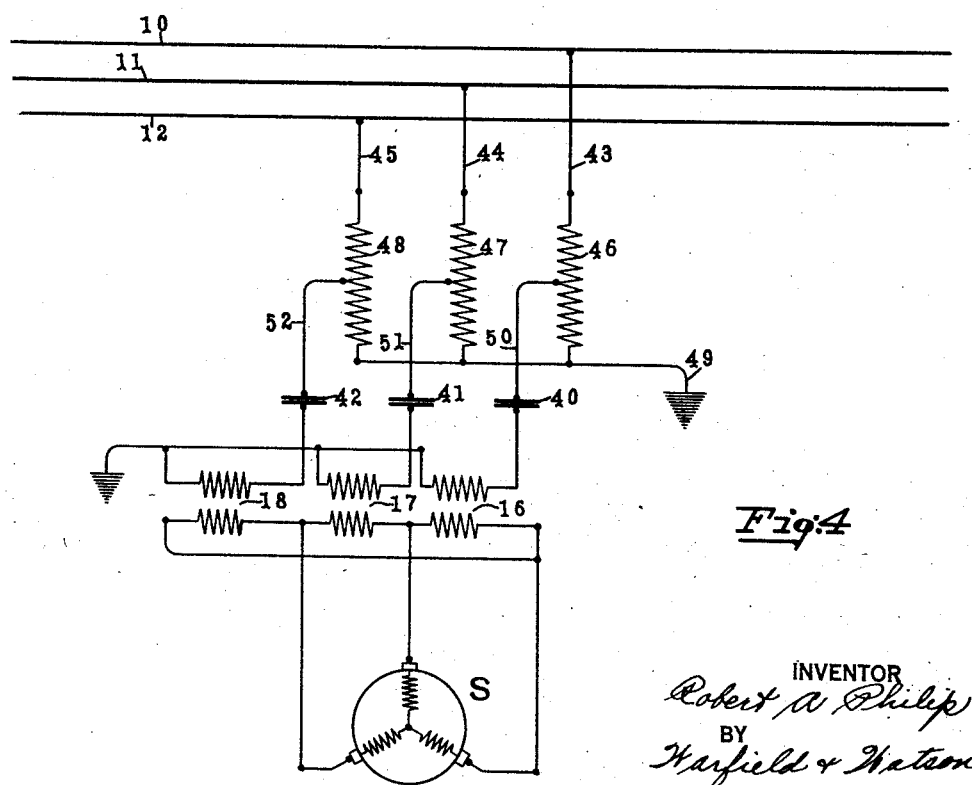

In Fig. 4 there is shown still another modification in which the location of the static condensers is such as still to take advantage of the location in the connection to the high voltage side of the transformers shown but is connected so that the maximum voltage on the high tension terminals of the transformers need not exceed the maximum voltage in the high tension line. Here the synchronous condenser S is shown as inductively connected to the line by means of the step-down transformers 16, 17 and 18. The static condensers 40, 41 and 42 are in series with the connections to the synchronous condenser but are not, however, directly connected to the line. The line connections, as shown at 43, 44 and 45, lead directly to the windings 46, 47 and 48 of a star-connected auto-transformer having a grounded neutral at 49. The connections 50, 51 and 52 leading respectively from the condensers 40, 41 and 42 are tapped into the windings of the auto-transformer at suitable points. When the synchronous condenser is operating with lagging currents the voltage of the static condensers 40, 41 and 42 would be added to the voltage of the line if they were directly connected to the line 43, 44 and 45 and give a resultant voltage on the transformers 16, 17 and 18 exceeding the line voltage. In this modification the static condensers are however connected to the auto-transformers 46, 47 and 48 at a point sufficiently below line voltage so that the resultant voltage on transformers 16, 17 and 18 need not exceed that of the line 43, 44 and 45. By means of this arrangement it will be seen that the regulating device may be employed to compensate for both leading and lagging currents in the transmission line without subjecting the transformers at any time to unduly severe voltages.

Where the condenser is placed in the high tension side of the connections to the transmission line, it is of course obvious that the static condenser must be insulated to withstand the full voltage to ground.

In Fig. 5, there is shown an arrangement whereby the advantage of high voltage across the static condenser is obtained without insulating against the full line voltage. Here again the synchronous condenser S is shown inductively connected to the transmission line through the transformers 16, 17 and 18. Here the static condensers are arranged to operate in the low tension side of the connections from the transformers which lead to the synchronous condenser S. For this purpose series or current transformers shown at 54, 55 and 56 respectively are placed in the connections, 57, 58 and 59 leading from the transformers to the synchronous condenser. Across the secondary or high tension side of each of the series transformers is connected a static condenser as indicated respectively at 60, 61 and 62. One side of each of these condensers may be grounded as indicated at 64, 65 and 66 respectively. The series transformers are also indicated as provided with adjustable taps 67, 68 and 69 in order to adjust the ratio of transformation and thereby vary the equivalent reactance of the static condenser so as to obtain different compoundings.

It will be seen that by means of an arrangement, provided in accordance with this invention, that the regulating effect upon the voltage of a transmission line operates substantially instantly to correct any deviation from normal, such correction operating over a wide range of current variation and being substantially independent of a limitation heretofore depending upon the effect of inductive reactance of the synchronous condenser.

The falling voltage characteristic of lines which have heretofore generally been obtained where voltage regulation was effected by means of synchronous condensers, is by means of this invention changed into one which is less falling or into one which neither falls nor rises, or if desired even to one having a rising voltage characteristic. It will also be perceived that the precision, quickness and hence stability of the regulating action is inherent in the arrangement here provided and hence is not affected by the characteristics of the transmission line to which it is connected.

By providing for the use of static condensers in addition to and in combination with synchronous condensers as here taught it will be perceived that it is no longer necessary to provide synchronous condensers for the full capacity of leading kilovolt-amperes required for line voltage regulation or power factor regulation consequently the size of the synchronous condensers for voltage regulation or power factor regulation may be materially reduced where this invention is practiced, thereby also reducing the copper and iron losses heretofore incident to voltage or power factor regulation. As a result the efficiency of the electrical system at full load becomes materially improved. The cost of construction will likewise be reduced since the construction of the static condensers to replace the capacity formerly incident to the full-sized synchronous condensers is materially less, outdoor construction and cheap materials being generally available for use in the construction of the static condensers where in the case of the synchronous condenser comparatively expensive materials are necessarily used.

It will be perceived that while describing this invention as used mainly in connection with synchronous condensers that the synchronous machine with which the capacitance of the static condenser is compounded is not necessarily confined to the synchronous condenser but may be used in conjunction with any synchronous dynamo-electric machine, for example, synchronous motors and synchronous generators, while the regulation effected by this invention is equally as applicable to single phase transmission as to polyphase transmission.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In an electrical system for distributing alternating currents, the combination with transmitting conductors, of a synchronous condenser connected electrically in multiple with said conductors and arranged to have a regulating effect, series transformers in said connections to said synchronous condenser, and static condensers connected across said series transformers, said static condensers being arranged to have their condensive reactance substantially equal in magnitude to the effective internal inductive reactance of their respective connections including the effective internal inductive reactance of said synchronous condenser.

2. In an electrical system for distributing alternating currents, the combination with transmitting conductors, of a synchronous condenser electrically connected in multiple with said conductors and arranged to have a regulating effect, static condensers disposed respectively in the connections leading to said synchronous condenser, said static condensers being arranged to have a series connection with said synchronous condenser through the said connections, the capacitance of said static condensers being proportioned so as to give a condensive reactance substantially equal in magnitude to the total effective internal inductive reactance of said connections including that of said synchronous condenser, and means for connecting said static condensers to give different compoundings of said reactances.

3. In an electrical system for distributing polyphase alternating currents, the combination with transmitting conductors, of a synchronous condenser arranged to be connected electrically in multiple with said conductors and to have a regulating effect, series transformers in the phase connections to said synchronous condenser, static condensers connected respectively across said series transformers for each phase, said condensers having their condensive reactance proportioned substantially to be equal and opposite the total effective internal inductive reactance of said synchronous condenser for each phase and the respective connection thereto, and means for varying the ratio of transformation respectively in the phases of said series transformers whereby to give different compoundings of said reactances.

In testimony whereof I affix my signature.

ROBERT A. PHILIP.